L. C. SANDS.
TUBULAR DRILL STEM FOR HYDRAULIC ROTARY DRILLING APPARATUS.
APPLICATION FILED MAR. 16, 1909.
940,733.  Patented Nov. 23, 1909.
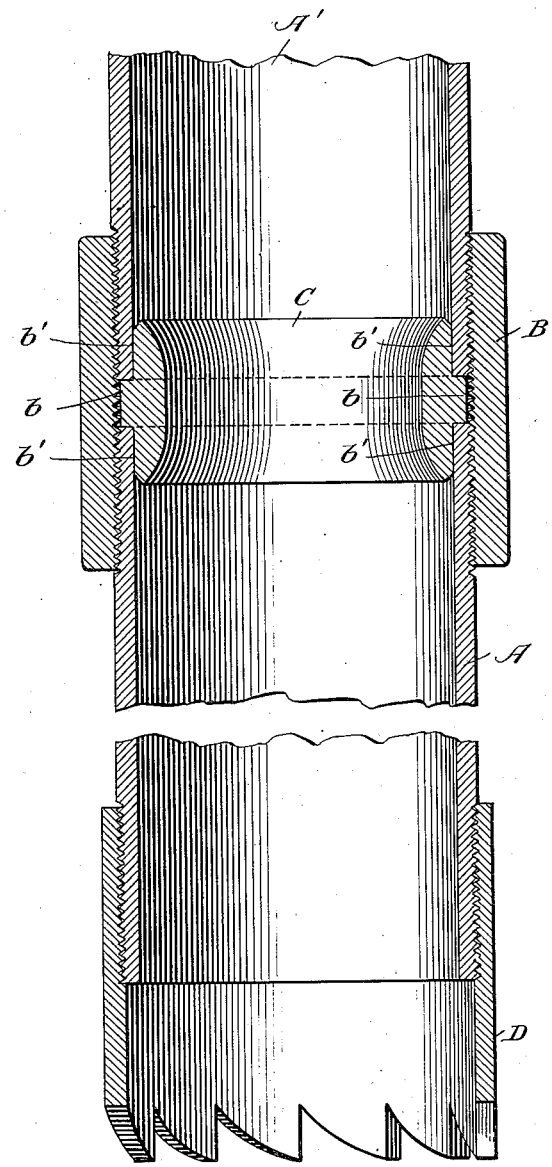

UNITED STATES PATENT OFFICE.

LOUIS C. SANDS, OF PITTSBURG, PENNSYLVANIA.

TUBULAR DRILL-STEM FOR HYDRAULIC ROTARY DRILLING APPARATUS.

940,733.

Specification of Letters Patent. Patented Nov. 23, 1909.

Application filed March 16, 1909. Serial No. 483,804.

*To all whom it may concern:*

Be it known that I, LOUIS C. SANDS, a citizen of the United States, residing at Pittsburg, in the county of Allegheny and State of Pennsylvania, have invented certain new and useful Improvements in Tubular Drill-Stems for Hydraulic Rotary Drilling Apparatus; and I do hereby declare the following to be a full, clear, and exact description of the invention, such as will enable others skilled in the art to which it appertains to make and use the same.

My invention relates to means for protecting the joints of sectional tubular drill stems used in hydraulic rotary drilling apparatus employed in sinking Artesian and oil wells.

In this class of apparatus well casing or tubing is commonly utilized as the drill stem and is armed at its lower end with a suitable cutter. As the depth of the well increases the length of the tubular stem is gradually increased by the addition of successive pipe sections and couplings, and as the cutting is effected by the rotation of the pipe or tubing to which the cutter is attached it follows, especially in the case of deep wells, that ultimately great torsional strain is brought on the couplings and the connected ends of the pipe sections. As a result of this torsional strain experience has shown that the ends of the sections are frequently forced within the coupling until they abut against each other with such force as to cause either the telescoping of the ends of the pipe or the spinning of inwardly projecting flanges on the ends of the sections, which inwardly projecting flanges obstruct the passage of water through the tubing. As a further result of the excessive inward movement of the ends of the pipe within the coupling the hold of the pipe on the collar is frequently broken or rendered weak and ineffective. Furthermore, it is seldom the case that the threaded ends of the pipe sections and the internal diameter of the threaded coupling member are so uniform in size that the ends of both pipes or tubes will enter the coupling member the same distance, therefore it is essential, where a joint of maximum strength is to be obtained to resist torsional strain, that the end of each pipe section should be free to enter the coupling the required distance to obtain an effective hold on the coupling member, and yet each of said pipe ends must be restrained against any tendency to bulge inwardly. This can best be accomplished if the means employed for protecting the joint be loosely movable within the tubes and coupling member so as to adjust itself with relation to said members no matter what relation to each other said members may assume. To overcome these several defects in tubular drill stems, and to meet the requirements for obtaining a joint of maximum strength to resist torsional strain, I provide a joint protector to be included within the adjacent ends of the tubular drill sections and the coupling member, said protector having a hollow body and cylindrical ends of slightly less diameter than the tubular drill rod, whereby the protector is rendered freely slidable within the tubular drill sections, and having means whereby when in position within the joint it is supported within the drill stem without engaging the coupling member, said protector being of such width as to overlap the adjacent ends of the coupled sections, and prevent the inward bulging thereof, and such a construction embodies the main feature of my invention.

In the drawings chosen for the purpose of illustrating my invention, the scope whereof is pointed out in the claims, there is shown a longitudinal central section of the ends of two tubular sections of a drill stem, the coupling member for connecting the same, and the preferred form of an interposed joint protector embodying my invention. In addition thereto the relation of the cutter to the lower pipe section is also shown.

I will now proceed to describe my invention more fully so that others skilled in the art to which it appertains may apply the same.

In the drawing, A, A' indicate the adjacent threaded ends of two sections of a tubular drill stem to the lower section A of which the usual or any approved cutter D is attached, and B indicates the coupling member or internally threaded sleeve by means of which the tubular stem sections A, A' are connected. C indicates the joint protector. The pipe sections A, A' and coupling member B may be such as are in common use, and the joint protector is formed independently thereof. The joint protector C is hollow and preferably of annular form. It has cylindrical portions b', b' whose external diameters are slightly less than the interior diameter of the tubular drill sections A, A' so that the protector may freely enter said sections A, A' to any required extent to prevent the inward bulging of the tubing. The width of said protector is such that it will when in position in the drill stem overlap the adjacent ends of the tubular sections A, A', and as the protector is freely slidable in the tubular drill stem between the adjacent ends of the sections A, A' some means should be provided for limiting it to its position between the ends of the sections A, A' within the coupling member B. For this purpose I prefer to provide an annular rib $b$ centrally disposed upon the periphery of the protector. In applying the protector to the drill stem the section A of the drill stem may be screwed into the coupling member B until an effective hold thereof on the coupling member for drilling purposes has been obtained, after which the coupler C may be dropped into the coupling member or sleeve B when one of its cylindrical portions $b'$ will enter the end of section A within the coupling, after which the tubular drill section A' may be screwed into the coupling member B until it obtains an effective hold on the coupling member, and this will bring the other cylindrical portion $b'$ of the protector within the end of tubular section A' in the coupling member B, so that the adjacent ends of both tubular drill sections will be prevented from inward bulging or flanging under any conditions. While in some instances the ends of the tubular drill stem sections A, A' may abut the annular rib $b$ of the protector which maintains the protector in position within the coupling member and between the adjacent ends of the tubular section yet such an adjustment of the several parts is not essential to the effectiveness of the devices, the only essential being that the protector should overlap the adjacent ends of the sections and be free to slidably assume any relation thereto that may be required by the extent to which each of said sections A, A' has entered the coupling member B in securing its effective hold on the coupling member.

It will be noted that as the joint protector C is loose or not connected with the coupling member it is not restrained or limited in its longitudinal movement within the coupling and this will permit the respective pipe sections to enter the coupling to any extent which will insure an equal degree of tightness and thus obtain a joint of maximum strength under torsional strain which will not result where the movement of the protector within the coupling is restricted by the coupling.

Having thus described my invention, what I claim and desire to secure by Letters Patent is:

1. A joint protector for tubular sectional drill stems, said protector being formed as a hollow body member provided with end portions having cylindrical external surfaces, and being adapted to be slidably supported within a tubular drill stem.

2. In a joint for tubular sectional drill stems, the combination with the tubular sections and coupling member therefor, of an included joint protector having a hollow body provided with end portions having cylindrical external surfaces, said protector slidably supported within the coupling member and tubular stem sections.

In testimony whereof I affix my signature, in presence of two subscribing witnesses.

LOUIS C. SANDS.

Witnesses:
A. G. HEGGEM,
W. W. ANDERSON.